US012505996B2

(12) United States Patent
Tiemeijer et al.

(10) Patent No.: US 12,505,996 B2
(45) Date of Patent: Dec. 23, 2025

(54) EELS AUTO-ALIGNMENT USING FULL IMAGE SIMULATION

(71) Applicant: FEI Company, Hillsboro, OR (US)

(72) Inventors: Peter Christiaan Tiemeijer, Eindhoven (NL); Alexander Henstra, Utrecht (NL)

(73) Assignee: FEI Company, Hillsboro, OR (US)

( * ) Notice: Subject to any disclaimer, the term of this patent is extended or adjusted under 35 U.S.C. 154(b) by 410 days.

(21) Appl. No.: 18/076,813

(22) Filed: Dec. 7, 2022

(65) Prior Publication Data

US 2024/0194466 A1 Jun. 13, 2024

(51) Int. Cl.
*H01J 49/44* (2006.01)
*H01J 49/00* (2006.01)

(52) U.S. Cl.
CPC .......... *H01J 49/0036* (2013.01); *H01J 49/44* (2013.01)

(58) Field of Classification Search
CPC .................. H01J 49/0036; H01J 49/44; H01J 2237/24485; H01J 2237/2802; H01J 37/244; H01J 37/26
USPC ........................................ 250/305, 306, 307
See application file for complete search history.

(56) References Cited

U.S. PATENT DOCUMENTS

2024/0379324 A1* 11/2024 Van Den Broek .......................... G01N 23/2251

* cited by examiner

*Primary Examiner* — Michael Maskell
(74) *Attorney, Agent, or Firm* — Kilpatrick Townsend & Stockton LLP

(57) ABSTRACT

Methods and systems for automatically tuning an EELS spectrometer according to the present disclosure include obtaining an initial measurement of an EELS spectrum, generating an simulated EELS spectrum fit to the initial measurement of the EELS spectrum, and estimating one or more values of one or more aberration parameters based on the simulated EELS spectrum. Then, using the value(s) of the aberration parameter(s) to tune the optical elements of the EELS spectrometer to remove and/or reduce aberrations in the EELS system.

20 Claims, 5 Drawing Sheets

600

EELS AUTO-ALIGNMENT USING FULL IMAGE SIMULATION

BACKGROUND OF THE INVENTION

Charged particle systems have been developed to allow scientists to perform electron energy loss spectroscopy (EELS) to investigate and gather compositional information on microscopic samples. One fundamental limitation that EELS systems face is the difficulty of tuning the optics of the system to obtain maximal resolution. In current systems, the elements within optical columns and/or EELS spectrometers must be mostly manually adjusted until the aberrations of the system are removed and/or greatly reduced. Because of this, laboratories containing current EELS systems must dedicate large amounts of time (e.g., 30+ minutes) of system tuning time before the system is ready to perform desired sample investigations. Moreover, in addition to requiring daily tuning time, the process of tuning optical columns/spectrometers to remove aberrations requires user expertise that further limits the implementation of EELS systems across laboratories. Specifically, because EELS systems detect thin spectrum bands, the reduced amount of detector data makes it hard for non-experts to recognize the effects of higher order aberrations from the limited information these thin spectrum bands provide.

While automation has provided useful for other types charged particle systems, present automation techniques are not well applicable to the EELS context. For example, while in TEM/SEM imaging you can use measurements of size or position of known patterns or structures to determine possible distortions from the expected image, but in EELS the obtained spectrum is only a set of thin peaks. Possible aberrations in the EELS spectrometer distort or blur these peaks, but it is difficult to derive from the shape of these distorted peaks accurate quantification of the various aberrations in the EELS spectrum. Even when formulae for the effect of individual aberrations on the peaks can be determined, the formulaic modeling of the superposition of such aberrations has proven to be unduly complex and time consuming. Accordingly, there is desired to have new systems and methods for automatically tuning EELS spectrometers/optical elements in a way that is robust, repeatable, efficient, and accurate.

SUMMARY OF THE INVENTION

Methods for automatically tuning an EELS spectrometer according to the present disclosure include obtaining an initial measurement of an EELS spectrum, generating a simulated EELS spectrum fit to the initial measurement of the EELS spectrum, and estimating one or more values of one or more aberration parameters based on the simulated EELS spectrum. Then, using the value(s) of the aberration parameter(s) to tune the optical elements of the EELS spectrometer to remove and/or reduce aberrations in the EELS system.

Systems for automatically tuning an EELS spectrometer according to the present disclosure may comprise a sample holder configured to hold a sample, an electron source configured to emit a beam of electrons towards the sample, an optical column configured to cause the beam of electrons to be incident on the sample, the optical column including the EELS spectrometer, and an EELS detector configured to detect electrons of the electron beam and/or emissions resultant from the electron beam being incident on the sample. According to the present disclosure the EELS spectrometer includes adjustable optical elements, wherein the settings of the optical elements can be changed so that aberrations in the plane of the EELS detector are reduced or otherwise corrected. The systems also include one or more processors, and a memory storing computer readable instructions that, when executed by the one or more processors, cause the corresponding system to perform one or more steps of methods according to the present disclosure.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicates similar or identical items.

Figure 1:
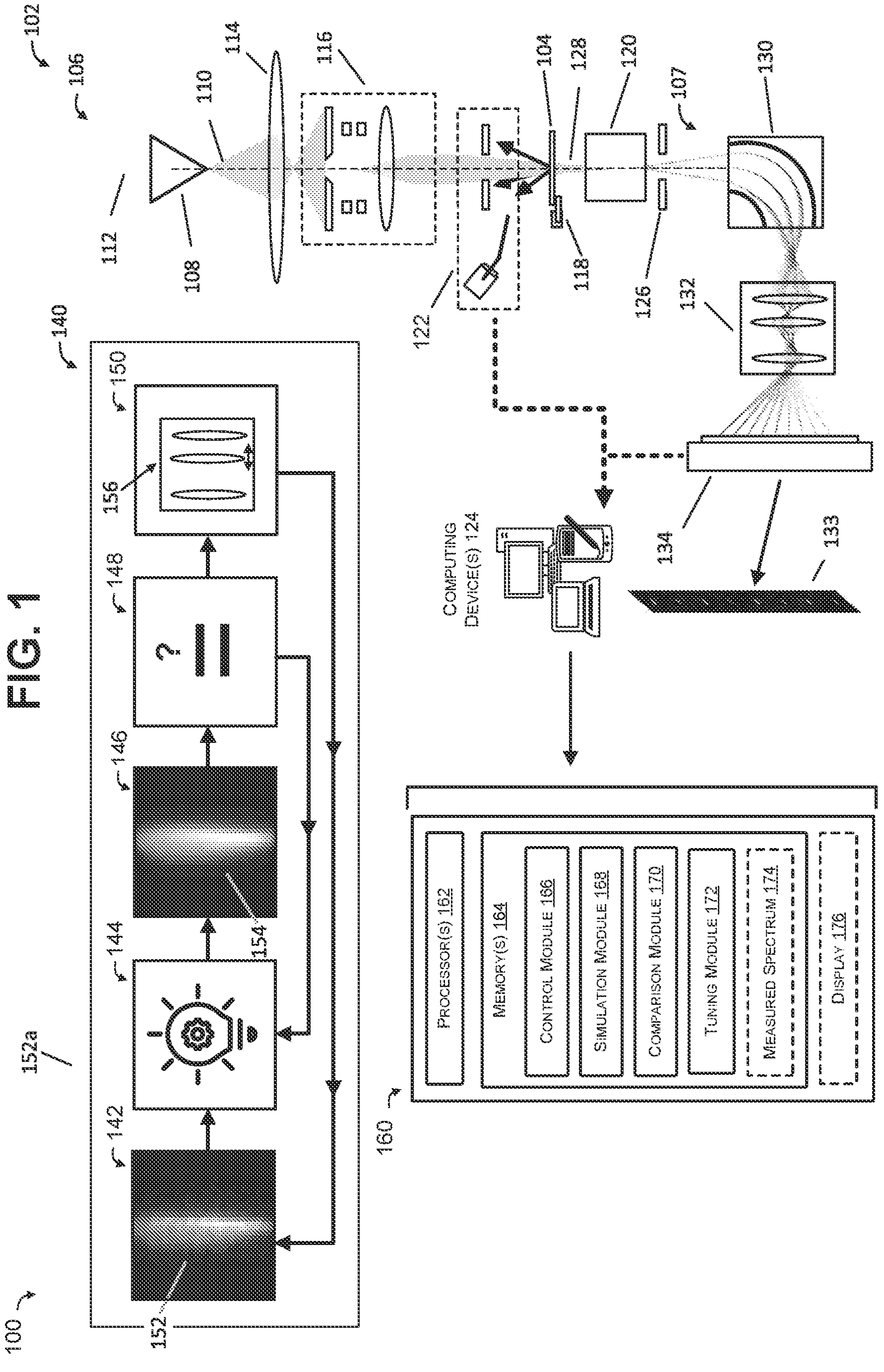
FIG. 1 illustrates example environment for automatically tuning an EELS spectrometer and/or other optical elements to correct for aberrations in EELS analysis using charged particle systems, according to the present disclosure.

Like reference numerals refer to corresponding parts throughout the several views of the drawings. Generally, in the figures, elements that are likely to be included in a given example are illustrated in solid lines, while elements that are optional to a given example are illustrated in broken lines. However, elements that are illustrated in solid lines are not essential to all examples of the present disclosure, and an element shown in solid lines may be omitted from a particular example without departing from the scope of the present disclosure.

DETAILED DESCRIPTION OF EMBODIMENTS

Methods and systems for automatically tuning an EELS spectrometer and/or other optical elements to correct for aberrations in EELS analysis using charged particle systems, are disclosed herein. More specifically, the methods and systems disclosed herein include and/or are configured to generate a simulated EELS spectrum that is fit to an initial measurement of an EELS spectrum, estimate the values of various aberration parameters using the simulated EELS spectrum. Specifically, many embodiments of the present invention comprise performing one or many simulations of EELS spectrum, and then iterating the simulations with varying aberration parameters until the simulated EELS spectrum that is fit to an initial measurement of an EELS spectrum is identified. Once the simulated EELS spectrum and the associated aberration parameters are identified, the methods and systems herein then tune the EELS spectrometer and/or other optical elements based on the estimated values to correct for aberrations affecting the measured EELS spectrum. Because such simulations according to the present invention can occur within 5-20 milliseconds, the methods and system of the present invention are able to rapidly correct for higher order aberrations in an electron microscope without requiring device downtime, user expertise, or high computing resources. Additionally, as EELS systems become more able to perform higher and higher resolution analysis, the system and methods according to the present disclosure are able to automatically obtain estimations of higher order aberrations without needing the computing resources or algorithmic complexity that would be required to model the combinatory effects of multiple orders of aberrations. Thus, the methods and systems according to the present disclosure help to democratize EELS analysis by reducing the time, expertise, and resource barriers that currently reduce its use.

According to the present disclosure, an aberration parameter corresponds to a value assigned to the effect of a corresponding aberration on the measured EELS spectrum. For example, an aberration parameter may correspond to the numerical value assigned to a tilt of a spectrum from an ideal orientation, a displacement of a spectrum along an x-axis from an ideal x-axis position, a displacement of the spectrum along a y-axis from an ideal y-axis position, a bend of the spectrum (e.g., a banana shaped curvature) of the spectrum, a distortion of the height of the spectrum from an expected height, a distortion of the width of the spectrum from an expected width. A person having skill in the art would understand that the numerical values may correspond to a weight, ratio, percentage, percentile, or any other way to quantify the effect of the corresponding aberration on a spectrum. Moreover, a person having skill in the art would understand that the aberrations that may be tuned according to the present disclosure and/or the aberration parameters may also correspond to many other aberrations, including higher order aberrations, such as asymmetric distortions, propellor distortions, etc.

FIG. 1 is an illustration of an example environment 100 for automatically tuning an EELS spectrometer and/or other optical elements to correct for aberrations in EELS analysis using charged particle systems 102, according to the present disclosure. Specifically, FIG. 1 shows example environment 100 as including example charged particle system(s) 102 for investigation and/or analysis of the sample 104. The example charged particle system(s) 102 may be or include one or more different types of optical, and/or charged particle microscopes, such as, but not limited to, a scanning electron microscope (SEM), a scanning transmission electron microscope (STEM), a transmission electron microscope (TEM), a charged particle microscope (CPM), a cryo-compatible microscope, focused ion beam microscope (FIBs), dual beam microscopy system, or combinations thereof. FIG. 1 shows the example charged particle microscope system(s) 102 as being a scanning transmission electron microscope (STEM) 106.

The example charged particle microscope system(s) 102 includes an electron source 108 (e.g., a thermal electron source, Schottky-emission source, field emission source, etc.) that emits an electron beam 110 along an emission axis 112 and towards an accelerator system 114. The emission axis 112 is a central axis that runs along the length of the example charged particle microscope system(s) 102 from the electron source 108 and through the sample 104. The accelerator system 114 that accelerates/decelerates, focuses, and/or directs the electron beam 110 towards a focusing column 116. The focusing column 116 focuses the electron beam 110 so that it is incident on at least a portion of the sample 104. In some embodiments, the focusing column 116 may include one or more of an aperture, scan coils, and upper condenser lens. The focusing column can focus electrons from electron source into a small spot on the sample. Different locations of the sample 104 may be scanned by adjusting the electron beam direction via the scan coils. Additionally, the focusing column 116 may correct and/or tune aberrations (e.g., geometric aberrations, chromatic aberrations) of the electron beam 110. FIG. 1 further illustrates the example charged particle microscope system(s) 102 as further including a sample holder 118 configured to hold the sample 104, and a sample stage that is able to translate, rotate, and/or tilt the sample 104 and sample holder 118 in relation to the example charged particle microscope system(s) 102.

FIG. 1 also shows the example charged particle microscope system(s) 102 as including detector systems 122, 126, and 134. While FIG. 1 illustrates the example charged particle microscope system(s) 102 as including three separate detector systems, a person having skill in the art would understand that an example charged particle microscope system(s) 102 as including may have a single detector system, or additional detector systems of the same or different modalities. Potential modalities in the example charged particle microscope system(s) 102 may include transmission electron microscopy (TEM) dark field imaging. TEM bright field imaging, diffraction pattern imaging, scanning transmission electron microscopy (STEM) bright field imaging. STEM dark field imaging, electron energy loss spectroscopy (EELS), energy dispersive X-ray spectroscopy (EDS. EDX, or XEDS), cathodoluminescence, and backscatter electrons (BSE). For example, a charged particle microscope system may include a high angle annular dark field (HAADF) detector system 126 as a first detector modality and an EDS detector system 122 as a second detector modality. The multiple detector systems 122 are further shown as being connected to one or more computing devices 124.

The STEM system 106 is further illustrated as having a projector lenses/projector system 120 that receive the portions of the electron beam 110 that transmit through the sample 104. Electrons 128 scattered by the sample 104 may be recorded by a STEM detector 126, and/or may enter the EELS spectrometer system 107. The spectrometer system 107 comprises a dispersive element 130 which fans out the electrons to a spectrum, and a system of lenses or multipoles 132 which magnifies the spectrum to a magnified spectrum 133 at detector 134. The detector 134 is preferably pixelated, in order to record the magnified spectrum 133 in parallel. The pixelation can be one-dimensional (e.g., as a 'strip detector') such that each separate energy is (ideally) recorded by one separate pixel, or the pixelation can be two-dimensional (e.g., as an image sensor) in order to record not only the intensity distribution of the spectrum 133 in the energy-dispersive direction but also the intensity distribution in the perpendicular direction. A person having skill in the art would understand that the intensity distribution in this perpendicular direction carries information that helps quantifying possible electron-optical aberrations in the spectrometer. The pixels in the detector may be square or may be elongated. The total size of the detector may be square or may be rectangular and elongated in the dispersive direction, or otherwise. Individual optical elements of the EELS spectrometer may be moved, have their voltages adjusted, and/or otherwise be adjusted such that different parts of the EELS spectrum may be imaged on the detector 134, or such that aberrations in the data detected by the detector 134 may be eliminated or otherwise reduced.

The computing device(s) 124 are configured to control operation of the example charged particle microscope system(s) 104, generate images of sample 104 and/or otherwise determine or interpret data from the detector systems 122, 126, and 134. According to the present invention, the computing device(s) 124 are configured to cause the charged particle microscope system(s) 102 to irradiate one or more locations on a surface region of the sample 102 with electron beam 110 (e.g., an electron beam), obtain detector data from a detector system 122, 126, and 134 (e.g., a dark field, EELS, EDS, EDX, XEDS or other type of imaging detector system), and then generate sample information (e.g., spectrum image, energy loss spectrum, a diffraction pattern, an initial image of the surface region, etc.) based on the detector data. The computing device(s) 124 are further configured to identify sample characteristics for regions on the surface within the initial sample information.

According to the present disclosure, the computing device(s) 124 are configured to initially acquire a measured EELS spectrum for a portion of a sample. The measured EELS spectrum may correspond to an EELS spectrum generated from irradiation of a sample (e.g., sample 104) with an electron beam during EELS investigation with a charged particle system (e.g., STEM 106). Then the different elements in the sample will generate sets of peaks in the EELS spectrum at different energy-losses (corresponding to energies of different excitations induced in the specimen, such as core-shell excitations, plasmon excitations, phonon excitations). Such set of peaks can be used to analyze the aberrations in the spectrometer and their dependence on the energy-loss. Preferably, such EELS spectrum is recorded with a detector 134 which is pixelated in two-dimension, as to maximize the available information on the shape of the peaks at the magnified spectrum 133.

Figure 6:
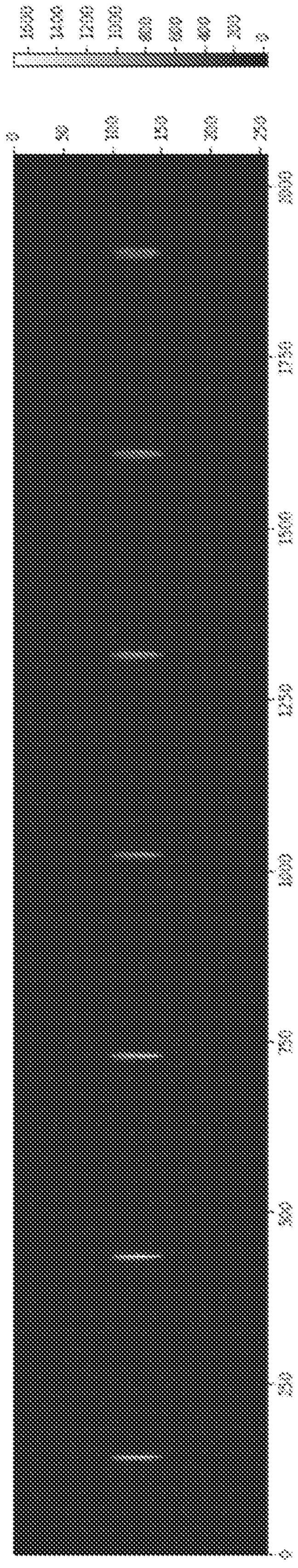
FIG. 6 shows an example of a measured EELS spectrum.

Alternatively, a measured EELS spectrum with a set of peaks may be assembled without a sample (or, alternatively, at an opening in the sample, or at a thin part of the sample) by measuring consecutively a number of EELS (sub-)spectra of the unaffected (or ‘zero loss’) beam, where each (sub-) spectrum is shifted to a different position on the detector. While such (sub-)EELS spectra are preferably shifted by consecutive offsets to the acceleration voltage (often referred to as ‘high tension offsets’) in accelerator system 114, a person having skill in the art would understand that obtaining shifted EELS (sub-)spectra may also comprise adjusting dispersion, adjusting prism current, adjusting voltage on a bias tube in the prism, applying a small defocus, small distortion, etc. so as to obtain a (directional) change in (sub-) spectra between two or more sets of EELS(sub-) spectra. Each such (sub-)spectrum contains only one peak, which is formed by the electrons that did not lose energy. This peak is usually called the zero-loss peak (ZLP). The width of this ZLP represents the resolution of the EELS system, and is determined by contributions from the electron source (such as the energy spread inherent to the emission process, or the energy spread after a monochromator), from the microscope (such as instabilities in the accelerating voltage), from the spectrometer (such as electron-optical aberrations), and from the detector (such as spilling-over of intensity from one pixel to its neighboring pixels, as described by the point-spread function (PSF)). The set of such ZLP sub-spectra (each shifted) can be assembled or summed to a single EELS spectrum with a multitude of peaks at (apparently) different energy positions. An example of a measurement of such assembled EELS spectrum containing seven peaks is illustrated in FIG. 6 for a two-dimensionally pixelated detector of rectangular shape. In this figure, the dispersion is in the horizontal direction.

It is known that EELS spectra assembled in such way can be used to quantify (and tune) some of the aberrations present in the EELS spectrometer. For example, Kahl et al. (see Adv Imag Elec Phys 212 (2019) 35) use such assembled spectrum to measure typical dimensions of the peaks (such as position, width, height, and tilt) and relate these through analytical expressions to some of the lower-order aberrations present in the spectrometer. However, this method is not suited for quantifying most aberrations of second-order or higher order, because the formulaic modeling of how the dimensions of such peaks are affected in the presence of superposition of multiple of such aberrations has proven to be unduly complex, time consuming, and difficult to invert.

Instead of measuring a set of typical dimensions of the peaks in the EELS spectrum and relating these through some analytical model to possible aberrations, the systems of the present disclosure use a set of many (first, second, or higher order) aberrations possible present in the system to simulate full images of these peaks.

Thus a measured EELS spectrum with such set of peaks at different positions (either obtained from specimen with known peak positions, either obtained by assembling a set of shifted ZLP (sub-)spectra) can be used by the computing device(s) 124 to compare with a simulated EELS spectrum and to determine how to tune optical elements.

In various embodiments, the computing device(s) 124 may obtain some of all of the measured EELS spectra from the detector through a network connection, a hardware connection, an accessible memory, and/or user input. For example, the computing devices may receive detector data from EELS detector 134 and then generate the measured EELS spectrum from the detector data. In an alternate example, the computing devices may obtain the measured EELS spectrum by accessing a data file on an accessible memory (e.g., local memory, USB drive, network accessible memory, etc.).

The computing device(s) 124 are then configured to generate a simulated EELS spectrum to fit to the initial measurement of the EELS spectrum. According to the present disclosure, the simulated EELS spectrum may be generated by simulating how the peaks in the spectrum are distorted or aberrated by the electron-optical aberrations in the spectrometer. The simulation may also include the contributions from the electron source (such as the energy spread inherently to the emission process), from the microscope (such as instabilities in the accelerating voltage) and from the detector (such as spilling-over of intensity from one pixel to its neighboring pixels). The EELS simulation may generate a spectrum of a single peak at a particular energy-loss (such as the ZLP spectrum) or may generate a plurality of (sub-)spectra with a plurality of peaks at different positions on the detector. For example, a software simulation may be conducted that calculates the expected path of electrons that enter the spectrometer at 10, 50, 100, 500, 1000, 2000, or more entrance positions, and/or at 1, 2, 5, 10 or more values of energy-loss, and/or at 1, 2, 5, 10 or more different values of starting energy at the source. Specifically, in order to analyze and tune the electron-optical aberrations, the software may calculate how the electromagnetic field effects of one or more optical components of a simulated charged particle system (e.g., optical column, lenses, EELS spectrometer, and/or components thereof) would be expected to cause electrons at each entrance position to travel through the system and impinge the EELS detector. In this way, the software simulation may generate a mapping of locations where electrons in the plurality of entrance positions are expected to be imaged on a detector. Such mapping then constitutes a simulated image (or simulated spectrum) of one or more peaks on the detector, which can be directly compared with the experimentally recorded image (or spectrum) of the one or more peaks on the detector.

When generating the simulated EELS spectrum, the computing device(s) 124 may use preset values for the parameters used in the simulation (e.g., one or more known aberrations, or a known energy spread of the source, or a known PSF of the detector) for the simulated charged particle system (or the components thereof) or may receive specific values from a user, or from specific settings of the microscope or spectrometer or source or monochromator, from some previous measurement, or from a neural network recognizing features in the experimental spectrum, or from comprising the experimental spectrum with a database or set of spectra with known aberrations, or from some other source. This can be used to generate a simulated EELS spectrum for the particular system settings. The more such settings of the components of the charged particle system are known a priori, the better (and/or the faster) the aberrations present in the measured images can be fitted and determined. This allows the computing device to assign aberration parameters to the simulated EELS spectrum for each of a plurality of types of aberrations effecting the spectrum (e.g., height, width, x-position, y-position, tilt, bend (banana), propellor, asymmetry, etc.). The aberration parameters may correspond to a percentile, percentage, weight, multiplier, or other numerical value that demonstrates the effect of a corresponding aberration type on the simulated EELS spectrum. Alternatively, while in the above embodiment the computing devices 124 simulate the expected EELS spectrum based on the settings of components of a simulated charged particle system, in other embodiments the simulation may be performed based on particular aberration parameters, and/or based on a combination thereof.

The computing device(s) 124 are further configured to determine whether the EELS spectrum is fit to the initial measured EELS spectrum. In some embodiments, one or more preprocessing operations are performed on the measured EELS spectrum, such as filtering noise, sharpening edges, adjusting brightness, etc. Preprocessing operations may further include generating an intensity map of the individual spectra in the initial measurement of the EELS spectrum, and/or determining a shape of individual spectra in the initial measurement of the EELS spectrum. Determining whether the EELS spectrum is fit to the initial measured EELS spectrum may comprise determining whether the simulated EELS spectrum is within a threshold fit of the initial measurement of the EELS spectrum. In some embodiments, the computing devices 124 may compare shapes and/or intensity mappings of the simulated EELS spectrum and the initial measurement of the EELS spectrum, generate a similarity score between them, and then determine whether the similarity score is within a threshold similarity value. For example, the computing devices 124 can identify a difference in intensity for each pixel location of the simulated EELS spectrum and the initial measurement of the EELS spectrum. A person having skill in the would understand that there are many ways to quantify such a determined difference, including, but not limited to averaging the difference across the mapping, squaring the differences, etc. If the computing device(s) 124 determine that the simulated image is within a threshold similarity, then the simulated EELS spectrum is determined to be fit to the measured EELS spectrum.

Alternatively, if the computing device(s) 124 determine that the simulated EELS spectrum is now within a threshold similarity then the computing device(s) 124 performs a new round of simulations with different settings for the simulated charged particle system (or the components thereof). The new round of simulations can include a single simulation with at least one changed setting, or a plurality of simulations that each are based on a different change in device settings. Once the new EELS spectrum is simulated, they are again compared with the measured EELS spectrum to identify a similarity therebetween to determine whether the similarity is within the threshold similarity. Additionally, in some embodiments the comparison with the new spectrum the computing device(s) 124 also determine the effect of the changes on the resultant similarity score, aberration parameters, etc. In this way, the computing device(s) are able to determine whether the changes cause more or less similarity to the measured EELS spectrum. In such embodiments, this effect information can be used to determine the changes to the device settings that are to be performed in the next round of simulations. This allows systems according to the present invention to iteratively simulate EELS spectrum in a way that trends towards more similarity, and eventually results in a simulated spectrum that is fit to the measured EELS spectrum.

The computing device(s) 124 then determine the aberration parameters in the simulated EELS image that is fit to the measured EELS spectrum, and then estimates that these aberration parameters are also the aberration parameters effecting the measured EELS spectrum. The computing device(s) 124 then recommend and/or actively cause the change of the settings of optical components within the charged particle system (e.g., STEM 106. EELS spectrometer 107, etc.) to tune the system and remove the estimated aberrations. For example, the individual settings of the optical elements of an EELS spectrometer may be adjusted based on a data structure that identifies relationships between the individual optical elements and corresponding aberration parameters. This data structure may be stored in an accessible memory or may be generated by performing small adjustments to the optical elements and measuring the effect on the aberrations in the system.

Once the optical elements are tuned, the computing device(s) 124 may cause or otherwise obtain a second measurement of an EELS spectrum of the sample. The process of generating a second simulated EELS spectrum is repeated to find a simulated spectrum that is fit to the second measurement of the EELS spectrum, and then the aberration parameters of the second measurement are estimated using the second simulated EELS spectrum. If the estimated aberration parameters do not show that the system and/or EELS spectrometer is tuned (i.e., the aberrations in the measured EELS spectrum have been sufficiently reduced), the computing device(s) 124 may cause another change of the settings of optical components within the charged particle system. This process may be iterated until the computing device(s) 124 determine that the system and/or EELS spectrometer is tuned. Once the system and/or EELS spectrometer is tuned, the computing device 124 may then cause the charged particle microscope system(s) 104 to initiate an investigation of the sample 102.

Those skilled in the art will appreciate that the computing devices 124 depicted in FIG. 1 are merely illustrative and are not intended to limit the scope of the present disclosure. The computing system and devices may include any combination of hardware or software that can perform the indicated functions, including computers, network devices, internet appliances, PDAs, wireless phones, controllers, oscilloscopes, amplifiers, etc. The computing devices 124 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

It is also noted that the computing device(s) 124 may be a component of the example charged particle microscope system(s) 124, may be a separate device from the example charged particle microscope system(s) 102 which is in communication with the example charged particle microscope system(s) 102 via a network communication interface, or a combination thereof. For example, an example charged particle microscope system(s) 102 may include a first computing device 124 that is a component portion of the example charged particle microscope system(s) 102, and which acts as a controller that drives the operation of the example charged particle microscope system(s) 102 (e.g., adjust the scanning location on the sample 104 by operating the scan coils, causes translations of the sample 104, etc.). In such an embodiment the example charged particle microscope system(s) 102 may also include a second computing device 124 that is desktop computer separate from the example charged particle microscope system(s) 102, and which is executable to process data received from one or more detector system(s) 122 to generate images of the sample 102, determine scan strategies for the sample 104, and/or perform other types of analysis. The computing devices 124 may further be configured to receive user selections via a keyboard, mouse, touchpad, touchscreen, etc.

FIG. 1 also depicts a visual flow diagram 140 that includes a plurality of images that together depict an example process that may be performed by the computing device(s) 124 for automatically tuning an EELS spectrometer and/or other optical elements to correct for aberrations in EELS, according to the present disclosure. For example, image 142 shows a peak of an EELS spectrum 152 that is obtained from detector data from EELS detector system 134. While image 142 shows a single EELS peak at some specific spectrum position, a person having skill in the art would understand that additional peaks at different spectrum positions can be obtained using offsets on high tension, or on the prism current, or on a bias tube, or differently. Image 144 shows a graphical representation of a simulation algorithm that performs one or more EELS simulations to generate a simulated EELS spectrum. Image 146 shows an individual simulated peak 154 generated by the simulation algorithm. Image 148 graphical representation of a comparison between the measured spectra 152 and the simulated spectrum 154. If the comparison results in the determination that the two are not sufficiently similar, then a new simulation is generated in the algorithm in 144. It the two are sufficiently similar, image 150) shows an element in an EELS spectrometer 156 being adjusted based on the aberration parameters in the simulated EELS spectra 146. The process depicted in 140 can be iterated until it is determined that the EELS spectrometer 156 is sufficiently tuned.

FIG. 1 further includes a schematic diagram illustrating an example computing architecture 160 of the computing devices 124. Example computing architecture 160 illustrates additional details of hardware and software components that can be used to implement the techniques described in the present disclosure. Persons having skill in the art would understand that the computing architecture 160 may be implemented in a single computing device 124 or may be implemented across multiple computing devices. For example, individual modules and/or data constructs depicted in computing architecture 160 may be executed by and/or stored on different computing devices 124. In this way, different process steps of the inventive method according to the present disclosure may be executed and/or performed by separate computing devices 124.

In the example computing architecture 160, the computing device includes one or more processors 162 and memory 164 communicatively coupled to the one or more processors 162. The example computing architecture 160 can include a control module 166, a simulation module 168, a comparison module 170, and a tuning module 172 stored in the memory 164. FIG. 1 further shows measured spectrum 174 as optionally being present in the memory 164.

As used herein, the term "module" is intended to represent example divisions of executable instructions for purposes of discussion and is not intended to represent any type of requirement or required method, manner or organization. Accordingly, while various "modules" are described, their functionality and/or similar functionality could be arranged differently (e.g., combined into a fewer number of modules, broken into a larger number of modules, etc.). Further, while certain functions and modules are described herein as being implemented by software and/or firmware executable on a processor, in other instances, any or all of modules can be implemented in whole or in part by hardware (e.g., a specialized processing unit, etc.) to execute the described functions. As discussed above in various implementations, the modules described herein in association with the example computing architecture 160 can be executed across multiple computing devices 124.

The control module 166 can be executable by the processors 162 to cause a computing device 122 and/or example charged particle microscope system(s) 102 to take one or more actions. For example, the control module 174 may cause the example charged particle microscope system(s) 102 to scan a surface of the sample 104 by causing the charged particle beam 110 to be deflected so as to traverse the point of incidence on the sample 104 along a desired path. The computing device 112 may then be configured to generate an initial measured EELS spectrum of a portion of the sample 104.

The simulation module 168 can be executable by the processors 162 to perform an EELS simulation in a simulated charged particle system having certain settings that results in the generation of one or more spectra at corresponding high-tension offset. For example, simulation module 162 may calculate the expected path of electrons that enter the spectrometer at 10, 50, 100, 500, 1000, 2000, or more entrance positions, and/or at 1, 2, 5, 10 or more values of energy-loss, and/or at 1, 2, 5, 10 or more different values of starting energy at the source. In this way, the simulation module may sum the results of such calculations to create a cumulative mapping of locations on an EELS detector where electrons in the simulated EELS experiment are expected to strike a detector. The initial settings of the simulated EELS system may be preset, may be received from an input, may be generated from the comparison of previously simulated EELS spectra to a measured EELS spectrum, or a combination thereof.

Additionally, because the settings of the components of the charged particle system are known, the aberrations present in the simulated images can be determined. This allows the simulation module 168 to assign aberration parameters to the simulated EELS spectrum for each of a plurality of types of aberrations effecting the spectrum (e.g., height, width, x-position, y-position, tilt, bend (banana), propellor, etc.). The aberration parameters may correspond to a percentile, percentage, weight, multiplier, or other numerical value that demonstrates the effect of a corresponding aberration type on the simulated EELS spectrum. Alternatively, while in the above embodiment the simulation module 168 simulates the expected EELS spectrum based on the settings of components of a simulated charged particle system, in other embodiments the simulation may be performed based on particular aberration parameters, and/or based on a combination thereof.

The comparison module 170 can be executable by the processors 162 to determine whether the EELS spectrum simulated by the simulation module 168 is fit to the initial measured EELS spectrum. In some embodiments, the comparison module 170 may perform one or more preprocessing operations are performed on the measured EELS spectrum, such as filtering noise, sharpening edges, adjusting brightness, generating an intensity map of the individual spectra in the initial measurement of the EELS spectrum, determining a shape of individual spectra in the initial measurement of the EELS spectrum, etc. The comparison module 170 may determine a similarity score between the initial measured EELS spectrum and the simulated EELS spectrum, and/or determine whether there is a threshold level of similarity between the two EELS spectrum. If the comparison module 170) determines that there is not a sufficient similarity between the simulated and measured EELS spectra then it may cause the simulation module 168 to generate one or more additional simulated EELS spectra, where the simulation module 168 uses different system settings when generating the additional simulated EELS spectra. The simulation module 168 may adjust the settings by a preset amount, may be based on prior simulations, based on prior comparisons, according to an adjustment schedule, or a combination thereof. The comparison module 170 is then configured to compare the new EELS simulations with the measured EELS spectrum. In this way, the two modules may iteratively simulate, compare, adjusted settings, and repeat until a sufficiently similar EELS spectrum is generated to the measured EELS spectrum.

If the comparison module 170 determines that the simulated EELS spectrum is not sufficiently similar to the measured EELS spectrum, then the simulation module 168 performs a new round of simulations with different settings for the simulated charged particle system (or the components thereof). The new round of simulations can include a single simulation with at least one changed setting, or a plurality of simulations that each are based on a different change in device settings. Once the new EELS spectrum is simulated, they are again compared with the measured EELS spectrum by the comparison module 170 to identify a similarity therebetween to determine whether the similarity is within the threshold similarity.

In some embodiments, the simulation module 168 may be configured to determine the effect of previous changes applied for previous simulations on the resultant similarity score, aberration parameters, etc. In this way, the simulation module 168 is able to determine whether the changes cause more or less similarity to the measured EELS spectrum, allowing the simulation module 168 to determine changes to the device settings for future simulations such that as the process iterates the simulated EELS spectra trend towards more similarity with the measured EELS spectrum.

Alternatively, if comparison module 170 determines that a simulated EELS spectrum is sufficiently similar to the measured EELS spectrum, then the tuning module 172 adjusts the optical elements of the EELS spectrometer to correct for estimated aberrations. The tuning module 174 estimates the aberrations affecting the measured EELS spectrum by assuming that they are the same as the aberrations affecting the simulated EELS spectrum that the comparison module 170) determined was a fit. Because the EELS spectrum was generated by a simulation, the tuning module 172 is able to determine the aberration parameters for it (e.g., by accessing metadata associated with the simulated EELS spectrum, by querying the simulation module 168, etc.).

The tuning module 172 may generate instructions that when executed by a processor associated with the charges particle system 102 cause one or more optical elements (e.g., lenses, spectrometers, apertures, etc.) to have their settings adjusted (e.g., charge changed, voltage changed, position altered, etc.) to correct estimated aberrations. Alternatively, or in addition, the tuning module 172 may generate recommended adjustments to the settings of optical components within the charged particle system (e.g., STEM 106, EELS spectrometer 132, etc.) that a user or other software suite can use to tune the system and remove the estimated aberrations. In some embodiments, the tuning module 172 may determine the appropriate adjustments based on a data structure that identifies relationships between the individual optical elements and corresponding aberration parameters. While not shown in FIG. 1, such a data structure may be stored in memory 164 or may be generated by performing small adjustments to the optical elements and measuring the effect on the aberrations in the system.

Once the optical elements are adjusted by the tuning module 174, the control module 166 may cause or otherwise obtain a second measurement of an EELS spectrum of the sample. The process of generating a second simulated EELS spectrum is repeated to find a simulated spectrum that is fit to the second measurement of the EELS spectrum, and then the aberration parameters of the second measurement is estimated using the second simulated EELS spectrum. If the estimated aberration parameters do not show that the system and/or EELS spectrometer is tuned (i.e., the aberrations in the measured EELS spectrum have been sufficiently reduced), the control module 166 may cause another change of the settings of optical components within the charged particle system. This process may be iterated until the it is determined that the system and/or EELS spectrometer is tuned. Once the system and/or EELS spectrometer is tuned, the control module 166 may then cause the charged particle microscope system(s) 102 to initiate an investigation of the sample 104.

As discussed above, the computing devices 124 include one or more processors 162 configured to execute instructions, applications, or programs stored in a memory(s) 164 accessible to the one or more processors. In some examples, the one or more processors 162 may include hardware processors that include, without limitation, a hardware central processing unit (CPU), a graphics processing unit (GPU), and so on. While in many instances the techniques are described herein as being performed by the one or more processors 162, in some instances the techniques may be implemented by one or more hardware logic components, such as a field programmable gate array (FPGA), a complex programmable logic device (CPLD), an application specific integrated circuit (ASIC), a system-on-chip (SoC), or a combination thereof.

The memories 164 accessible to the one or more processors 162 are examples of computer-readable media. Computer-readable media may include two types of computer-readable media, namely computer storage media and communication media. Computer storage media may include volatile and non-volatile, removable, and non-removable media implemented in any method or technology for storage of information, such as computer readable instructions, data structures, program modules, or other data. Computer storage media includes, but is not limited to, random access memory (RAM), read-only memory (ROM), erasable programmable read only memory (EEPROM), flash memory or other memory technology, compact disc read-only memory (CD-ROM), digital versatile disk (DVD), or other optical storage, magnetic cassettes, magnetic tape, magnetic disk storage or other magnetic storage devices, or any other non-transmission medium that may be used to store the desired information and which may be accessed by a computing device. In general, computer storage media may include computer executable instructions that, when executed by one or more processing units, cause various functions and/or operations described herein to be performed. In contrast, communication media embodies computer-readable instructions, data structures, program modules, or other data in a modulated data signal, such as a carrier wave, or other transmission mechanism. As defined herein, computer storage media does not include communication media.

Those skilled in the art will also appreciate that items or portions thereof may be transferred between memory 164 and other storage devices for purposes of memory management and data integrity. Alternatively, in other implementations, some or all of the software components may execute in memory on another device and communicate with the computing devices 124. Some or all of the system components or data structures may also be stored (e.g., as instructions or structured data) on a non-transitory, computer accessible medium or a portable article to be read by an appropriate drive, various examples of which are described above. In some implementations, instructions stored on a computer-accessible medium separate from the computing devices 124 may be transmitted to the computing devices 124 via transmission media or signals such as electrical, electromagnetic, or digital signals, conveyed via a communication medium such as a wireless link. Various implementations may further include receiving, sending or storing instructions and/or data implemented in accordance with the foregoing description upon a computer-accessible medium.

Figure 2:
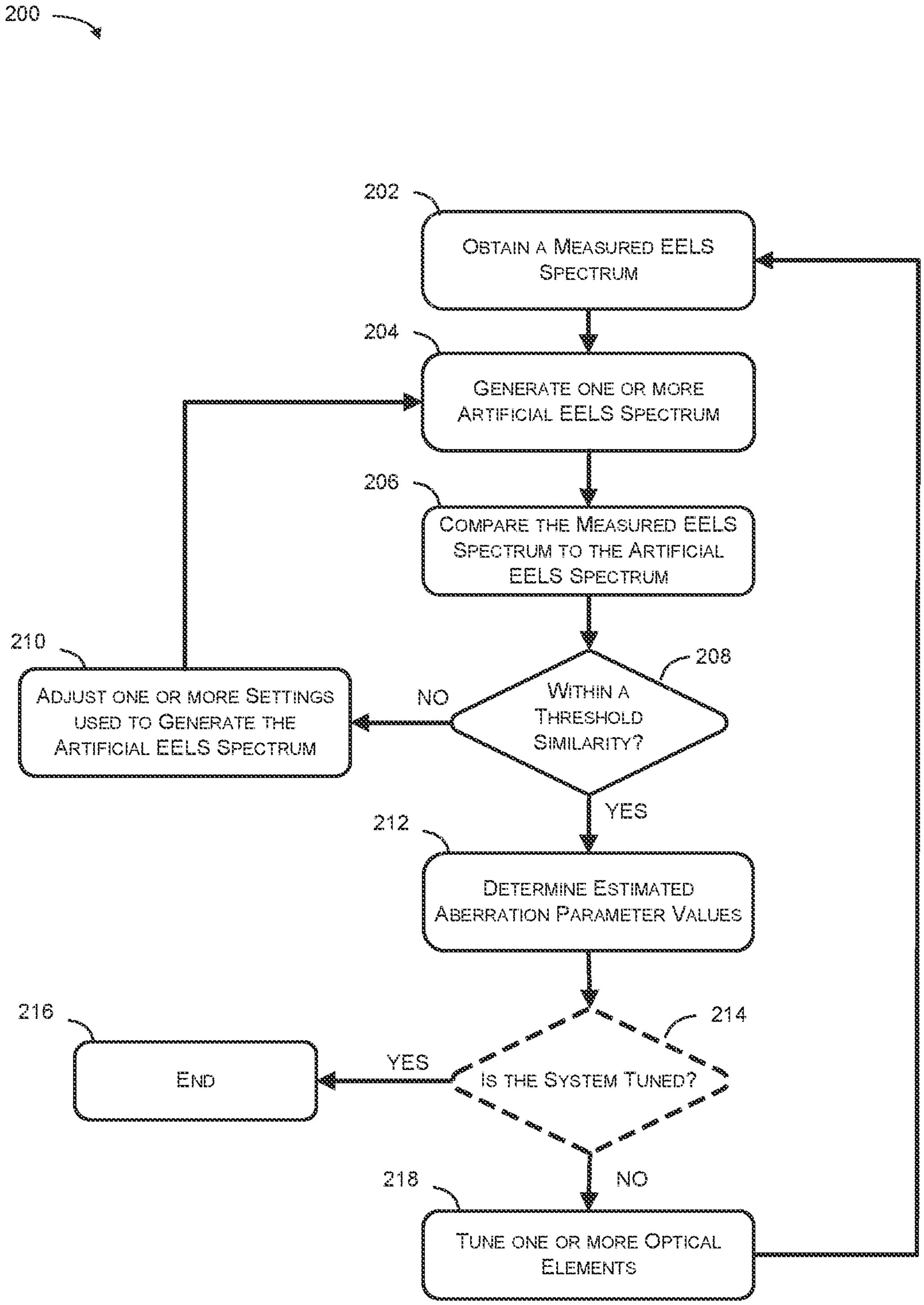
FIG. 2 illustrates a sample process for automatically tuning an EELS spectrometer and/or other optical elements to correct for aberrations in EELS analysis using charged particle systems, according to the present disclosure.

FIG. 2 is a depiction of a sample process 200 for automatically tuning an EELS spectrometer and/or other optical elements to correct for aberrations in EELS analysis using charged particle systems 102, according to the present disclosure. The process 200 may be implemented by any of the environment 100, example charged particle microscope system(s) 102, computing device(s) 124, computing architecture 160, or another environment.

At 202, an initial measured EELS spectrum is obtained. The initial measured EELS spectrum corresponds to an EELS spectrum generated from irradiation of a sample with a charged particle beam during EELS investigation in a charged particle system. Alternatively, such measured EELS spectrum may correspond to one or more (sub-)spectra measured at corresponding shifts generated by high-tension offsets, or by adjustments of prism current or bias voltage in the prism, or small defocuses or distortions set to the system, or a combination thereof. In various embodiments, the initial measured EELS spectrum may be acquired by scanning the sample with a charged particle device (e.g., electron microscope), an imaging device, user input, accessed via an accessible memory, over network connection, or a combination thereof. Alternatively, data from an EELS detector may be accessed, and the EELS spectrum may be generated from the detector data.

At 204, one or more potential EELS spectrum is generated. The simulated EELS spectrum may be generated by performing an EELS simulation in a simulated charged particle system having certain settings that results in the simulation of one or more spectra at corresponding energy losses. By calculating the expected path of electrons that are emitted by the sample at various entrance positions, a cumulative mapping of locations on an EELS detector where electrons in the simulated EELS experiment are expected to strike a detector can be created. The initial settings of the simulated EELS system may be preset, may be received from an input, may be generated from the comparison of previously simulated EELS spectra to a measured EELS spectrum, or a combination thereof. In various embodiments, the simulated EELS spectrum may be generated by assuming the components of the simulated charged particle system have certain settings, by simulating particular aberration parameters as affecting the simulated electron paths, or a combination thereof.

At 206, the measured EELS spectrum is compared to the simulated EELS spectrum to determine whether the simulated EELS spectrum is fit to the initial measured EELS spectrum. In some embodiments, this comparison may involve determining a similarity score between the initial measured EELS spectrum and the simulated EELS spectrum, and/or determine whether there is a threshold level of similarity between the two EELS spectrum. Then, at 208, it is determined whether the measured EELS spectrum and the simulated EELS spectrum are within a threshold similarity.

If there is not a sufficient similarity between the measured EELS spectrum and the simulated EELS spectrum, then the process continues to step 210, and the settings used to generate the simulated EELS spectrum are adjusted. The settings may be adjusted by a preset amount, may be based on prior simulations, based on prior comparisons, according to an adjustment schedule, or a combination thereof. For example, based on a prior adjustment to a particular aberration parameter resulting in a simulated EELS spectrum that was less similar to the measured EELS spectrum, the settings may be adjusted so that an opposite adjustment is applied to the particular aberration parameter. The process then continues at step 204, where one or more additional EELS spectra are simulated using the adjusted one or more settings. In this way, steps 204-210 allow for iterative simulations of EELS spectra until an simulated EELS spectrum that is sufficiently fit to the measured EELS spectrum is generated.

Once the answer at step 208 is yes, the process continues at step 212, and the aberration parameter values affecting the measured EELS spectrum are estimated. Because the settings of the simulated components of the simulated charged particle system are known, the aberrations employed in the simulated EELS spectrum can be quantified (i.e., to assign aberration parameters to the simulated EELS spectrum for each of a plurality of types of aberrations effecting the spectrum). Moreover, because the simulated EELS spectrum is fit to the measured EELS spectrum, it can be estimated that the aberration parameters affecting the measured EELS spectrum are the same as those affecting the simulated EELS spectrum.

At 214, it is optionally determined whether the system is tuned. If the answer is yes (i.e., the estimated aberration parameters show that the aberrations are corrected and/or sufficiently small), the process ends at step 216 where the tuned charged particle system may then be used for EELS investigations. If the answer at step 214 is no, then the process continues to step 218, where one or more optical elements (e.g., lenses, spectrometers, apertures, etc.) of a charged particle system are tuned (e.g., current changed, voltage changed, position altered, etc.) based on the estimated aberration parameter values. The one or more optical elements may be tuned (or instructions on what adjustments need to be made to tune them) according to a data structure that identifies relationships between the individual optical elements and corresponding aberration parameters. Such a data structure may be stored in an accessible memory or may be generated by performing small adjustments to the optical elements and measuring the effect on the aberrations in the system.

Once the optical elements are tuned, the process then returns to step 202 and another measured EELS spectrum is obtained. A person having skill in the art would understand how process steps 202-214 could be repeated until the system is determined to be tuned in step 214. Additionally, in some embodiments each iteration may use the results of previous iterations to inform the decisions made therein. In this way, a person having skill in the art would understand how the process steps could be designed to employ information from prior iterations to cause subsequent iterations to trend towards a tuned system.

A person having skill in the art would understand that the order of steps shown in FIG. 2 are merely an example order, and that according to the present invention the methods described herein can be carried out in a different order.

Figure 3A:
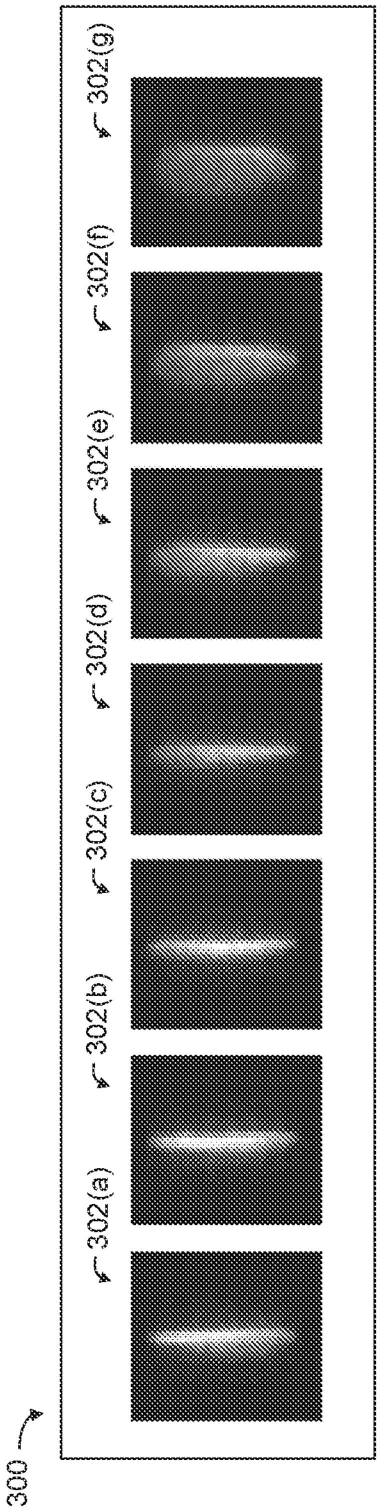
FIGS. 3A and 3B show an example measured EELS spectrum and an example simulated EELS spectrum fit to the measured EELS spectrum using the methods and systems of the present disclosure.
Figure 3B:
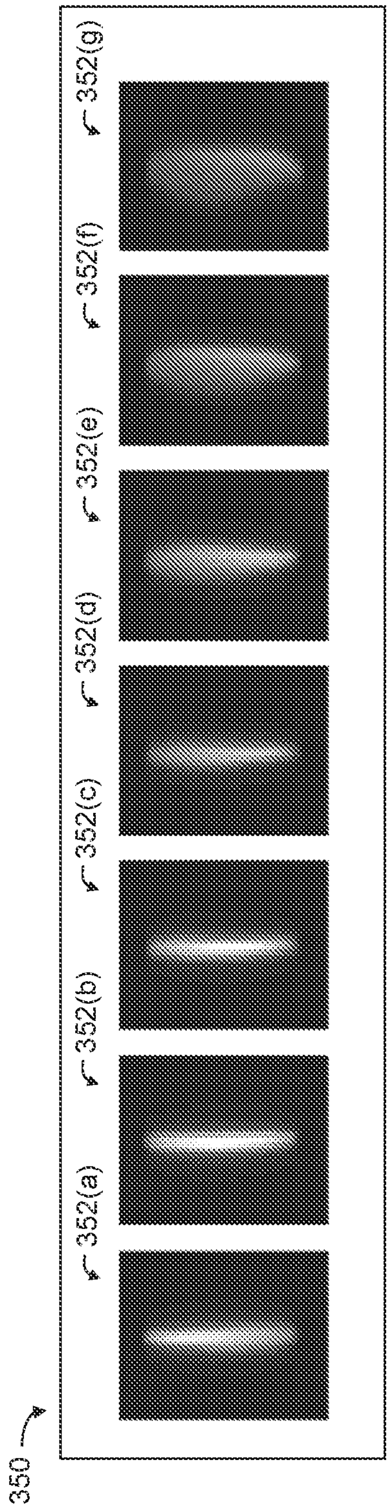

FIGS. 3A and 3B show an example measured EELS spectrum 300 and an simulated EELS spectrum 350 fit to the measured EELS spectrum, using the methods and systems of the present disclosure. Specifically, FIG. 3A shows a collection of individual measured EELS (sub-)spectra of the ZLP 302(*a*-*g*) that each are captured at a different high-tension offset. FIG. 3B shows a collection of individual simulated EELS (sub-)spectra 352(*a*-*g*) that have been generated to be fits for the measured EELS (sub-)spectra 302(*a*-*g*) using the methods and systems of the present disclosure.

The EELS spectra 300 have been measured using an EELS spectrometer with a round entrance aperture which was homogeneously illuminated. Similarly, the EELS spectra 350 have been simulated assuming a homogeneously illuminated round entrance aperture. Round apertures are often preferred in EELS spectrometers because they maximize the accepted number of electrons for a given deviation from the optical axis.

A person having skill in the art would understand that other shapes of apertures may be used (e.g., square or rectangular or slit-shaped or with multiple holes) each with their own specific benefits, and that the present invention can be adapted to these different shapes by correspondingly adapting the shape of the entrance aperture used for the simulated spectra. A person having skill in the art would also understand that an entrance aperture with multiple holes can increase the number of features to which the generated spectra may be compared or fitted, provided each hole is sufficiently separated and recognizable from the other holes.

A person having skill in the art would understand that the illumination does not need to be homogeneous across the entrance aperture. If the EELS spectrum is measured with an illumination of which the intensity is inhomogeneously distributed across the entrance aperture of the energy filter, then the EELS spectrum should be simulated using the same inhomogeneous distribution of intensity. This requires that the computing device(s) 124 that simulates the spectrum receives inputs that describes this distribution. Such input may be obtained, for example, by an imaging camera that records the beam intensity at the entrance aperture of the spectrometer, or by adjusting the lens system 132 such that the detector 134 records an image of the beam at the entrance aperture of the filter.

Figure 4:
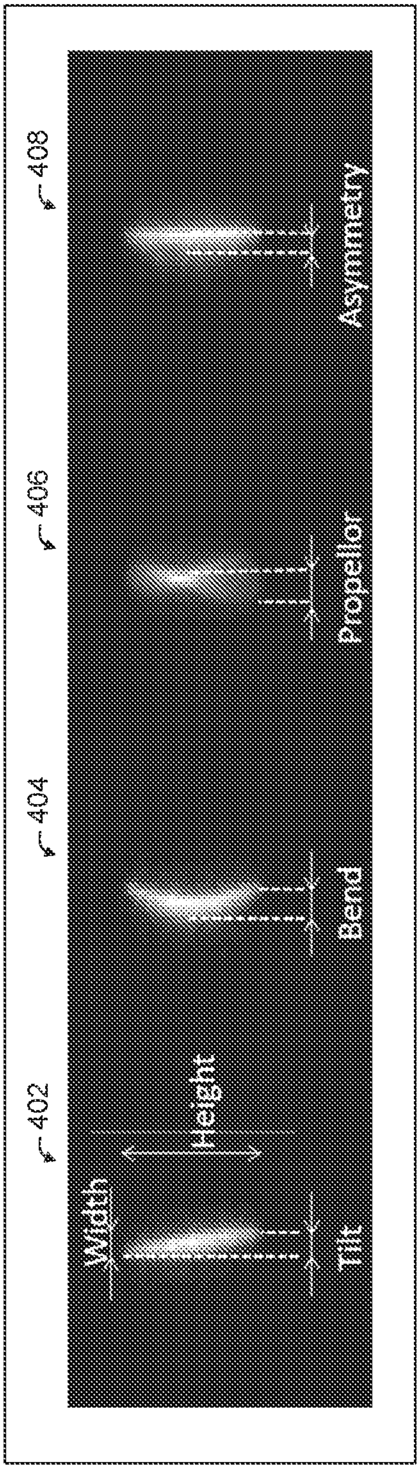
FIG. 4 shows examples of aberrations present in EELS measurements that may be automatically corrected for by the systems and methods of the present disclosure.

FIG. 4 shows examples of aberrations present in EELS measurements that may be automatically corrected for by the systems and methods of the present disclosure. Mathematically, aberrations can be defined as described in the following lines. Electrons enter the EELS spectrometer at entrance coordinates ($x_{in}$, $y_{in}$) relative to the optical axis, and with energy loss E (relative to the energy of the electrons without energy loss). The EELS spectrometer disperses and focuses these electrons such that their coordinates ($x_{det}$, $y_{det}$) on the detector are, ideally, uniquely related to their energy E. For example, the spectrometer may be such that, ideally, the x-position on the detector linearly depends on the energy loss of the electron and that the y-position on the detector is a simple geometric image of the beam at the spectrometer's entrance:

$$x_{det}=d\cdot E+x_0, \tag{1}$$

$$y_{det}=M_y\cdot y_{in}+y_0, \tag{2}$$

where d denotes dispersion, $M_y$ denotes the (geometric) magnification in the y-direction, and ($x_0$, $y_0$) denote the coordinates of the center of the spectrum. Typically, the dispersion d and the magnification $M_y$ can be adjusted by changing the excitations of the lenses or multipoles 132.

However, the optical elements (lenses, multipoles, deflectors) may be imperfectly manufactured or positioned or excited. Furthermore, most optical elements intrinsically have unwanted high-order optical effects. Therefore, the actual positions on the detector will deviate from the ideal detector positions. In its most general form, the position on the detector including these deviations (or distortions or aberrations) may be written as a Taylor series expansion:

$$x_{det}=\Sigma_{n,m,k}\cdot C_{nmk}x_{in}^{\ n}\cdot y_{in}^{\ m}\cdot E^k, \tag{3}$$

$$y_{det}=\Sigma_{n,m,k}D_{nmk}x_{in}^{\ n}\cdot y_{in}^{\ m}\cdot E^k \tag{4}$$

where the summations over the indices n,m,k run from zero to infinity. The sum n+m+k denotes the order of the coefficients. The zeroth order coefficients $C_{000}$ and $D_{000}$ are equal to the coordinates ($x_0$, $y_0$) of the center of the spectrum, and the first order coefficients $C_{001}$ and $D_{010}$ are equal to the dispersion d and magnification $M_y$, all introduced in the previous paragraph. All other coefficients $C_{nmk}$ and $D_{nmk}$ denote aberrations or distortions which negatively affect the resolution of the spectrometer.

Specifically, image 402 shows an experimental EELS spectrum that demonstrates the width (corresponding to coefficient $C_{100}$), height (coefficient $D_{010}$), and the tilt aberrations (coefficient $C_{010}$). Similarly, images 404-408 show experimental EELS spectra demonstrating the effect of the individual example second-order aberrations of bend (coefficient $C_{020}$), propellor (coefficient $C_{110}$), and asymmetry (coefficient $C_{200}$), respectively. A person having skill in the art would understand that there are many more aberrations that may be present in an EELS spectrum and which may be simulated and/or corrected for using the methods and systems of the present invention. Additionally, a person having such skill will also understand that there exist varying strategies to assign numerical values that quantify the effect of each parameter on an image, and that these quantification strategies are encompassed within the breadth of this disclosure.

Figure 5:
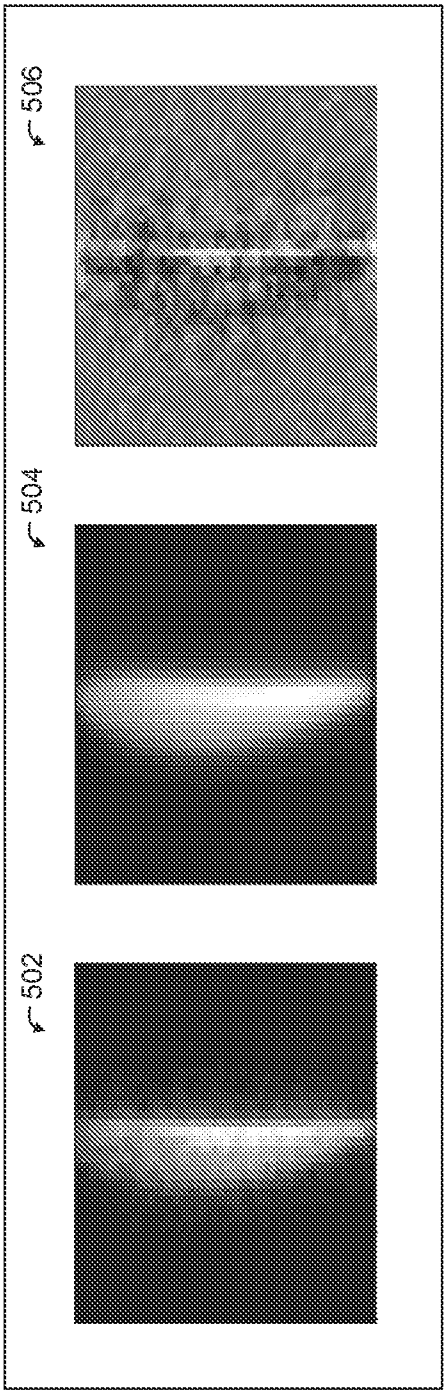
FIG. 5 shows an example comparison between a measured EELS spectrum and a simulated EELS spectrum according to the present disclosure.

FIG. 5 shows an example comparison between a measured EELS spectrum and a simulated EELS spectrum according to the present disclosure. Specifically, images 502 and 504 show an intensity mapping of measured EELS spectrum and an EELS spectrum simulated according to the present disclosure, respectively. Image 506 shows the difference between these two spectra. In some embodiments, the differences represented in image 506 may be used to determine a similarity score between the two spectra. For example, the difference across the spectra mapping can be averaged, individual differences can be squared, or a combination thereof. FIG. 6 shows an example of a measured EELS spectrum. Specifically, FIG. 6 shows a measured EELS spectrum that contains seven spectra measured at corresponding high-tension offsets.

The invention disclosed herein has been exemplified for the case of measuring and tuning a charged particle system with an EELS spectrometer, specifically for measuring and tuning the aberrations present in the (sub-)spectra of ZLP peaks in the EELS spectrum. A person having skill in the art would understand how the method disclosed herein may equally well be applied to other charged particle systems where optical aberrations must be quantified and tuned with only one (or a few) small images of the beam at hand. Here, a small image of the beam means an image of a substantially focused beam, which substantially focused beam has only a few dimensions (such as width, height, tilt), and where substantial information on the aberrations present in the system is carried by the intensity distribution inside this substantially focused beam.

An example of such image is the image of a focused probe in a scanning transmission electron microscope (STEM), in which the image of the probe (at the sample plane) can be recorded by the using the projector lenses of the STEM to transfer a magnified image of the focused probe to the image detector. In this example, the image of the probe may be simulated using series expansions similar to equations (3) and (4) where the coordinates ($x_{in}$, $y_{in}$) represent the starting positions of the electrons in a diffraction plane of the focused probe, or equivalently, the incident angles at the focused probe. Additionally, the simulated image of the probe may comprise contributions of diffraction effects (such as Fresnel diffraction), of the geometrical size of the electron source, of instabilities of the microscope, of the point spread function of the detector, or of deflection noise due to stochastic currents in the surrounding metal parts (such as Johnson noise).

Examples of inventive subject matter according to the present disclosure are described in the following enumerated paragraphs.

A1. A method for automatically tuning an EELS spectrometer, the method comprising the steps of obtaining an initial measurement of an EELS spectrum: generating an simulated EELS spectrum fit to the initial measurement of the EELS spectrum: estimating a value of an aberration parameter based on the simulated EELS spectrum: tuning the EELS spectrometer based on the value of the aberration parameter.

A1.1. The method of paragraph A1, wherein the aberration parameter corresponds to one of height, width, x-position, y-position, tilt, bend, propellor, and asymmetry.

A1.1.1 The method of paragraph A1, wherein the aberration parameter corresponds to a second order aberration ($C_{nmk}$ or $D_{nmk}$ with n+m+k=2) or to a third order aberration ($C_{nmk}$ or $D_{nmk}$ with n+m+k=3)

A1.2. The method of any of paragraphs A1-A1.1.1, further comprising estimating values of a plurality of additional aberration parameters based on the simulated EELS spectrum: and wherein the EELS spectrometer is further tuned based on the values of a plurality of additional parameters.

A1.2.1. The method of paragraph A1.2, wherein the additional aberration parameters correspond to one or more of height, width, x-position, y-position, tilt, bend (banana), and propellor.

A1.3. The method of any of paragraphs A1-A1.2.1, wherein when the optical elements of the EELS spectrometer are in a first configuration state when the initial measurement of the EELS spectrum is generated, and the tuning of the EELS spectrometer causes the optical elements of the EELS spectrometer to be in a second configuration state.

A2. The method of any of paragraphs A1-A1.3, wherein the initial measurement of the EELS spectrum corresponds to one or more spectra measured at corresponding spectrum shifts, where the spectrum is shifted by adjusting high tension, or prism current, or prism bias voltage, or spectrometer defocus or distortion, or a combination thereof.

A2.1. The method of paragraph A2, wherein the one or more spectra comprises a first spectrum measured at a first spectrum shift and a second spectrum measured at a second spectrum shift, wherein the first spectrum shift is different from the second spectrum shift.

A2.2. The method of any of paragraphs A2-A2.1, wherein the initial measurement of the EELS spectrum comprises 3, 4, 5, 6, 7, or 8 spectrum that are each measured at corresponding spectrum shift.

A2.3. The method of any of paragraphs A2-A2.2, wherein the initial measurement of the EELS spectrum is obtained by performing an EELS analysis with a charged particle microscope system.

A2.3.1 The method of paragraph A2.3, wherein the method comprises, causing the charged particle microscope system to perform the EELS analysis to obtain the initial measurement of an EELS spectrum.

A2.4. The method of any of paragraphs A2-A2.3.1, wherein the initial measurement of an EELS spectrum is obtained by receiving detector data from an EELS detector of the charged particle system.

A2.4. The method of any of paragraphs A2-A2.4, wherein the initial measurement of an EELS spectrum is obtained by accessing a data on an accessible memory.

A2.4.1. The method of paragraph A2.4, wherein the data file was generated at least in part using detector data from an EELS detector of the charged particle system.

A2.5. The method of any of paragraphs A1-A2.4.1, wherein the method further comprises applying one or more spectrometers to the initial measurement of the EELS spectrum.

A2.6. The method of any of paragraphs A1-A2.5, wherein the method further comprises applying a sharpening algorithm to the initial measurement of the EELS spectrum A2.7. The method of any of paragraphs A1-A2.6, wherein the method further comprises determining an intensity map of the individual spectra in the initial measurement of the EELS spectrum.

A2.8. The method of any of paragraphs A1-A2.7, wherein the method further comprises determining a shape of individual spectra in the initial measurement of the EELS spectrum.

A2.8.1. The method of paragraph A2.8, wherein the shape is determined based on a corresponding intensity map of the individual spectrum.

A3. The method of any of paragraphs A1-A2.8.1, wherein generating the EELS spectrum comprises performing an EELS simulation.

A3.1. The method of paragraph A3, wherein performing the EELS simulation comprises calculating locations where a plurality of entrance positions is expected to be imaged on a detector.

A3.1.1. The method of paragraph A3.1, wherein calculating the locations where the plurality of entrance positions is expected to be imaged on the detector comprises calculating corresponding locations on the detector for at least 10, 50, 100, 500, 1000, 2000, or more entrance positions.

A3.1.2. The method of paragraph A3.1, wherein calculating the locations where the plurality of entrance positions is expected to be imaged on the detector comprises calculating corresponding locations on the detector for at least and/or at 1, 2, 5, 10 or more values of energy-loss.

A3.1.3. The method of paragraph A3.1, wherein calculating the locations where the plurality of entrance positions is expected to be imaged on the detector comprises calculating corresponding locations on the detector for at least 2, 5, 10 or more different values of starting energy of the electrons at the source. A3.1.4. The method of any of paragraphs A3.1-A3.1.3, wherein generating the EELS simulation comprises summing the locations on the detector where the plurality of entrance positions is expected to be imaged on the detector to form a simulated EELS spectrum.

A3.2. The method of any of paragraphs A3-A3.1.4, wherein performing the EELS simulation comprises selecting initial values for one or more aberration parameters.

A3.2.1. The method of paragraph A3.2, wherein generating the EELS spectrum comprises generating a first simulated EELS spectrum using the initial values for the one or more aberration parameters.

A3.3. The method of any of paragraphs A3-A3.2.1, wherein generating the EELS spectrum comprises determining whether an initial simulated EELS spectrum is within a threshold fit of the initial measurement of the EELS spectrum.

A3.3.1. The method of paragraph A3.3, wherein the determination of whether the initial simulated EELS spectrum is within the threshold fit includes generating a similarity score between the initial simulated EELS spectrum and the initial measurement of the EELS spectrum.

A3.3.2. The method of any of paragraphs A3.3-A3.3.1, wherein the determination of whether the initial simulated EELS spectrum is within the threshold fit comprises generating a first intensity map of the spectrum distribution in the initial simulated EELS spectrum; generating a second intensity map of the spectrum distribution in the initial measurement of the EELS spectrum: and comparting the first intensity map to the second intensity map.

A3.3.3. The method of any of paragraphs A3.3-A3.3.2, wherein the determination of whether the initial simulated EELS spectrum is within the threshold fit comprises determining a difference in intensity in all pixels between the initial simulated EELS spectrum and the initial measurement of the EELS spectrum.

A3.3.4. The method of any of paragraphs A3.3-A3.3.3, wherein the determination of whether the initial simulated EELS spectrum is within the threshold fit comprises determining a first shape of a first spectrum distribution depicted in the initial simulated EELS spectrum, determining a second shape of a second spectrum distribution depicted in the initial measurement of the EELS spectrum, and comparing the first shape and the second shape.

A3.3.5. The method of any of paragraphs A3.3-A3.3.4, wherein the comparing comprises comparing a plurality of distributions depicted in the initial measurement of the EELS spectrum at different high-tension offsets to corresponding spectrum distributions in the initial measurement of the EELS spectrum at the corresponding high-tension offset.

A3.4. The method of any of paragraphs A3-A3.3.5, wherein in response to determining that a simulated EELS spectrum is within the threshold fit of the initial measurement of the EELS spectrum, selecting said simulated EELS spectrum as the simulated EELS spectrum fit to the initial measurement of the EELS spectrum.

A3.5. The method of any of paragraphs A3-A3.3.5, wherein in response to determining that a simulated EELS spectrum is not within the threshold fit of the initial measurement of the EELS spectrum, performing one or more additional simulations.

A3.5.0. The method of paragraph A3.5, where performing one or more additional simulations comprises iteratively adapting the values of the aberration parameters used in the simulation, and recalculating the simulated EELS spectrum, until the best fit is found between the initial measurement of the EELS spectrum and a particular simulated EELS spectrum.

A3.5.0.1. The method of paragraph A3.5.0, wherein the particular simulated EELS spectrum is the simulated EELS spectrum fit to the initial measurement of the EELS spectrum.

A3.5.1. The method of any of paragraphs A3.5-A3.5.0, wherein each simulation comprises adjusting one or more aberration parameters.

A3.5.2. The method of any of paragraphs A3.5-A3.5.1, wherein each simulation comprises adjusting a single aberration parameter.

A3.5.3. The method of any of paragraphs A3.5-A3.5.2, wherein each simulation comprises making a different adjustment to the one or more aberration parameters.

A3.5.4. The method of any of paragraphs A3.5-A3.5.3, wherein the aberration parameters are adjusted based on the initial aberration parameters and the comparison between the initial simulated EELS spectrum and the initial measurement of the EELS spectrum.

A3.5.4.1. The method of paragraph A3.5.4, wherein the aberration parameters are further adjusted based on previous simulations, previous adjustments of aberration parameters, and/or previous comparisons between the previous simulated EELS spectrum and the initial measurement of the EELS spectrum.

A3.5.6. The method of any of paragraphs A3.5-A3.5.3, wherein performing the one or more additional simulations comprises performing multiple simulations in parallel.

A3.5.7. The method of any of paragraphs A3.5-A3.5.6, further determining whether each of the additional simulations is within a threshold fit of the initial measurement of the EELS spectrum A3.5.7.1. The method of paragraph A3.5.7, further comprising repeating the processes of paragraphs A3.3.1-A3.3.5, with the additional simulations.

A3.5.8. The method of any of paragraphs A3.5-A3.5.7.1, further comprising determining an effect of an adjustment of at least one aberration parameter on the similarity to the initial measurement of the EELS spectrum based on prior adjustments of the aberration parameters, previous simulations, and/or previous comparisons between the previous simulated EELS spectrum and the initial measurement of the EELS spectrum.

A3.5.8.1. The method of paragraph 3.5.8, wherein the parameters are adjusted based at least in part on the effect.

A3.9. The method of any of paragraphs A3-A3.5.8.1, wherein the EELS simulation is a 20, 30-, 50-, 100-, or 200-pixel square simulation.

A3.10. The method of any of paragraphs 3-3.9, where the EELS simulation is a simulated spectra at corresponding spectrum shifts.

A3.10.1. The method of paragraph A3.10, wherein performing the EELS simulation comprises simulating a plurality of simulated spectra at corresponding spectrum shifts.

A4. The method of any of paragraphs A1-13.10.1, wherein tuning the EELS spectrometer based on the value of the aberration parameter comprises adjusting one or more optical elements of the EELS spectrometer based on the aberration parameter associated with the simulated EELS spectrum fit.

A4.1. The method of any of paragraphs A1-A4, wherein the method further comprises capturing a second measurement of an EELS spectrum: generating a second simulated EELS spectrum fit to the second measurement of the EELS spectrum: estimating a second value of an aberration parameter based on the second simulated EELS spectrum: and tuning the EELS spectrometer based on the second value of the aberration parameter.

A4.1.1. The method of paragraph A4.1, further comprising repeating the process of A4.1 until an image measured by the charged particle system is within a threshold similarity to an expected value for a tuned system.

A4.2. The method of any of paragraphs A4-A4.1, wherein this process of capturing, generating, estimating, and tuning is repeated at least 5, 10, 20, or 40 times.

A4.3. The method of any of paragraphs A4-A4.2, wherein the optical elements are tuned based on a data structure identifying relationships between the individual optical elements and individual aberration parameter.

A4.3.1. The method of paragraph A4.3, wherein the data structure identifying the relationships is generated by applying slight changes to the optical elements and measuring the effect of individual slight changes on each aberration parameter.

A4.3.2. The method of any of paragraphs A4-A4.3.1, wherein the data structure is an effect matrix that identifies a corresponding effect on individual aberration parameters of a plurality of optical element.

B1. A method automatically tuning a charged particle system, the method comprising the steps of obtaining an initial image of a probe spot: generating an simulated probe spot fit to the initial image of the probe spot: estimating a value of an aberration parameter based on the generated probe spot: and tuning the charged particle system based on the value of the aberration parameter.

B1.0. The method of paragraph B1, wherein the probe spot corresponds to an image of a charged particle beam probe as detected by one or more detectors within a charged particle system.

B1.2. The method of any of paragraphs B1-B1.1, further comprising estimating values of a plurality of additional aberration parameters based on the generated probe spot: and wherein the charged particle system is further tuned based on the values of a plurality of additional parameters.

B1.3. The method of any of paragraphs B1-B1.2.1, wherein when the optical elements of the charged particle system are in a first configuration state when the initial measurement of the probe spot is generated, and the tuning of the charged particle system causes the optical elements of the charged particle system to be in a second configuration state.

B2. The method of any of paragraphs B1-B1.3, wherein the initial measurement of the probe spot is obtained by performing an analysis with a charged particle microscope system.

B2.1. The method of paragraph B2, wherein the method comprises, causing the charged particle microscope system to perform the analysis to obtain the initial measurement of a probe spot.

B2.4. The method of any of paragraphs B2-B2.1, wherein the initial measurement of a probe spot is obtained by receiving detector data from a detector of the charged particle system.

B2.4. The method of any of paragraphs B2-B2.4, wherein the initial measurement of a probe spot is obtained by accessing a data on an accessible memory.

B2.4.1. The method of paragraph B2.4, wherein the data file was generated at least in part using detector data from a detector of the charged particle system.

B2.5. The method of any of paragraphs B1-B2.4.1, wherein the method further comprises applying one or more filters to the initial measurement of the probe spot.

B2.6. The method of any of paragraphs B1-B2.5, wherein the method further comprises applying a sharpening algorithm to the initial measurement of the probe spot.

B2.7. The method of any of paragraphs B1-B2.6, wherein the method further comprises determining an intensity map of the individual images in the initial measurement of the probe spot.

B2.8.1. The method of paragraph B2.8, wherein the shape is determined based on a corresponding intensity map of the probe spot B3. The method of any of paragraphs B1-B2.8.1, wherein generating the probe spot comprises performing a probe spot simulation.

B3.1. The method of paragraph B3, wherein performing the probe spot simulation comprises calculating locations where a plurality of entrance positions is expected to be imaged on a detector.

B3.1.1. The method of paragraph B3.1, wherein calculating the locations where the plurality of entrance positions is expected to be imaged on the detector comprises calculating corresponding locations on the detector for at least 10, 50, 100, 500, 1000, 2000, or more starting positions.

B3.1.2. The method of any of paragraphs B3.1-B3.1.1, wherein generating the probe spot simulation comprises summing the locations on the detector where the plurality of starting positions is expected to be imaged on the detector to form a simulated Probe spot.

B3.2. The method of any of paragraphs B3-B3.1.2, wherein performing the probe spot simulation comprises selecting initial values for one or more aberration parameters.

B3.2.1. The method of paragraph B3.2, wherein generating the probe spot comprises generating a first simulated probe spot using the initial values for the one or more aberration parameters.

B3.3. The method of any of paragraphs B3-B3.2.1, wherein generating the probe spot comprises determining whether an initial simulated probe spot is within a threshold fit of the initial measurement of the probe spot.

B3.3.1. The method of paragraph B3.3, wherein the determination of whether the initial simulated probe spot is within the threshold fit includes generating a similarity score between the initial simulated probe spot and the initial measurement of the probe spot.

B3.3.2. The method of any of paragraphs B3.3-B3.3.1, wherein the determination of whether the initial simulated probe spot is within the threshold fit comprises generating a first intensity map of the intensity distribution in the initial simulated probe spot; generating a second intensity map of the intensity distribution in the initial measurement of the probe spot: and comparting the first intensity map to the second intensity map.

B3.3.3. The method of any of paragraphs B3.3-B3.3.2, wherein the determination of whether the initial simulated probe spot is within the threshold fit comprises determining a difference in intensity in all pixels between the initial simulated probe spot and the initial measurement of the probe spot.

B3.3.4. The method of any of paragraphs B3.3-B3.3.3, wherein the determination of whether the initial simulated probe spot is within the threshold fit comprises determining a first shape of a first intensity distribution depicted in the initial simulated probe spot, determining a second shape of a second intensity distribution depicted in the initial measurement of the probe spot, and comparing the first shape and the second shape.

B3.4. The method of any of paragraphs B3-B3.3.5, wherein in response to determining that a simulated probe spot is within the threshold fit of the initial measurement of the probe spot, selecting said simulated probe spot as the simulated probe spot fit to the initial measurement of the probe spot.

B3.5. The method of any of paragraphs B3-B3.3.5, wherein in response to determining that a simulated probe spot is not within the threshold fit of the initial measurement of the probe spot, performing one or more additional simulations.

B3.5.0. The method of paragraph B3.5, where performing one or more additional simulations comprises iteratively adapting the values of the aberration parameters used in the simulation, and recalculating the simulated probe spot, until the best fit is found between the initial measurement of the probe spot and a particular simulated probe spot.

B3.5.0.1. The method of paragraph B3.5.0, wherein the particular simulated probe spot is the generated probe spot fit to the initial measurement of the probe spot.

B3.5.1. The method of any of paragraphs B3.5-B3.5.0, wherein each simulation comprises adjusting one or more aberration parameters.

B3.5.2. The method of any of paragraphs B3.5-B3.5.1, wherein each simulation comprises adjusting a single aberration parameter.

B3.5.3. The method of any of paragraphs B3.5-B3.5.2, wherein each simulation comprises making a different adjustment to the one or more aberration parameters.

B3.5.4. The method of any of paragraphs B3.5-B3.5.3, wherein the aberration parameters are adjusted based on the initial aberration parameters and the comparison between the initial simulated probe spot and the initial measurement of the probe spot.

B3.5.4.1. The method of paragraph B3.5.4, wherein the aberration parameters are further adjusted based on previous simulations, previous adjustments of aberration parameters, and/or previous comparisons between the previous simulated probe spot and the initial measurement of the probe spot.

B3.5.6. The method of any of paragraphs B3.5-B3.5.3, wherein performing the one or more additional simulations comprises performing multiple simulations in parallel.

B3.5.7. The method of any of paragraphs B3.5-B3.5.6, further determining whether each of the additional simulations is within a threshold fit of the initial measurement of the probe spot B3.5.7.1. The method of paragraph B3.5.7, further comprising repeating the processes of paragraphs B3.3.1-B3.3.X, with the additional simulations.

B3.5.8. The method of any of paragraphs B3.5-B3.5.7.1, further comprising determining an effect of an adjustment of at least one aberration parameter on the similarity to the initial measurement of the probe spot based on prior adjustments of the aberration parameters, previous simulations, and/or previous comparisons between the previous simulated probe spot and the initial measurement of the probe spot.

B3.5.8.1. The method of paragraph B3.5.8, wherein the parameters are adjusted based at least in part on the effect.

B3.9. The method of any of paragraphs B3-B3.5.8.1, wherein the probe spot simulation is a 20, 30-, 50-, 100-, or 200-pixel square simulation.

B3.10. The method of any of paragraphs B3-3.9, where the probe spot simulation is a simulated spectra at corresponding high-tension offset.

B3.10.1.

B4. The method of any of paragraphs B1-B13.10.1, wherein tuning the charged particle system based on the value of the aberration parameter comprises adjusting one or more optical elements of the charged particle system based on the aberration parameter associated with the generated probe spot fit.

B4.1. The method of any of paragraphs B1-B4, wherein the method further comprises capturing a second measurement of a probe spot: generating a second simulated probe spot fit to the second measurement of the probe spot: estimating a second value of an aberration parameter based on the second simulated probe spot: and tuning the charged particle system based on the second value of the aberration parameter.

B4.1.1. The method of paragraph B4.1, further comprising repeating the process of B4.1 until an image measured by the charged particle system is within a threshold similarity to an expected value for a tuned system.

B4.2. The method of any of paragraphs B4-B4.1.1, wherein this process of capturing, generating, estimating, and tuning is repeated at least 5, 10, 20, or 40 times.

B4.3. The method of any of paragraphs B4-B4.2, wherein the optical elements are tuned based on a data structure identifying relationships between the individual optical elements and individual aberration parameter.

B4.3.1. The method of paragraph B4.3, wherein the data structure identifying the relationships is generated by applying slight changes to the optical elements and measuring the effect of individual slight changes on each aberration parameter.

B4.3.2. The method of any of paragraphs B4-B4.3.1, wherein the data structure is an effect matrix that identifies a corresponding effect on individual aberration parameters of a plurality of optical element.

C1. A charged particle system for investigating a sample, the system comprising: a sample holder configured to hold a sample; an electron source configured to emit a beam of electrons towards the sample; an optical column configured to cause the beam of electrons to be incident on the sample; an EELS spectrometer configured to correct for aberrations, one or more detectors configured to detect charged particles of the electron beam and/or emissions resultant from the electron beam being incident on the sample, one or more processors; and a memory storing computer readable instructions that, when executed by the one or more processors, cause the system to perform the method of any of paragraphs A1-A4.3.2 or B1-B4.3.2.

D1. Non-transitory computer readable instructions, that when executed on one or more processors of a charged particle microscopy system, cause the one or more processors to perform the methods of any of paragraphs A1-A4.3.2 or B1-B4.3.2.

E1. Use of a charged particle system of paragraphs C1 to perform any of the methods of paragraphs A1-A4.3.2 or B1-B4.3.2.

F1. Use of the non-transitory computer readable instructions of paragraph D1.

F1.1. Use of the non-transitory computer readable instructions of paragraph D1 to perform any of the methods of paragraphs A1-A4.3.2 or B1-B4.3.2.

What is claimed is:

1. Non-transitory computer readable media comprising instructions, that when executed on one or more processors of a system, the one or more processors cause the performance of a method for automatically tuning an EELS spectrometer, the method comprising the steps of:

obtaining an initial measurement of an EELS spectrum;

generating a simulated EELS spectrum fit to the initial measurement of the EELS spectrum;

estimating a value of an aberration parameter based on the simulated EELS spectrum; and tuning the EELS spectrometer based on the value of the aberration parameter.

2. The computer readable media of claim 1, wherein the aberration parameter corresponds to one of height, width, x-position, y-position, tilt, bend, asymmetry, and propellor.

3. The computer readable media of claim 1, further comprising:

estimating values of a plurality of additional aberration parameters based on the simulated EELS spectrum; and wherein the EELS spectrometer is further tuned based on the values of a plurality of additional parameters.

4. The computer readable media of claim 1, wherein optical elements of the EELS spectrometer are in a first configuration state when the initial measurement of the EELS spectrum is generated, and the tuning of the EELS spectrometer causes the optical elements of the EELS spectrometer to be in a second configuration state.

5. The computer readable media of claim 1, wherein the initial measurement of the EELS spectrum corresponds to one or more spectra measured by a charged particle system at corresponding spectrum shifts.

6. The computer readable media claim 5, wherein the method further comprises, causing the charged particle system to perform an EELS analysis to obtain the initial measurement of the EELS spectrum.

7. The computer readable media of claim 1, wherein the method further comprises at least one of:

determining an intensity map of individual spectra in the initial measurement of the EELS spectrum; and determining a shape of the individual spectra in the initial measurement of the EELS spectrum.

8. The computer readable media of claim 1, wherein generating the simulated EELS spectrum comprises performing an EELS simulation.

9. The computer readable media of claim 8, wherein performing the EELS simulation comprises calculating locations where one or more of:

a plurality of entrance positions are expected to be imaged on a detector;

a plurality of energy shifts are expected to be imaged on a detector; and a plurality of starting energies are expected to be imaged on a detector.

10. The computer readable media of claim 1, wherein generating the simulated EELS spectrum comprises determining whether an initial simulated EELS spectrum is within a threshold fit of the initial measurement of the EELS spectrum.

11. The computer readable media of claim 10, wherein the determination of whether the initial simulated EELS spectrum is within the threshold fit comprises:

generating a first intensity map of the spectrum distribution in the initial simulated EELS spectrum;

generating a second intensity map of the spectrum distribution in the initial measurement of the EELS spectrum; and comparing the first intensity map to the second intensity map.

12. The computer readable media of claim 10, wherein the determination of whether the initial simulated EELS spectrum is within the threshold fit comprises determining a first shape of a first spectrum distribution depicted in the initial simulated EELS spectrum, determining a second shape of a second spectrum distribution depicted in the initial measurement of the EELS spectrum, and comparing the first shape and the second shape.

13. The computer readable media of claim 12, wherein the comparing comprises comparing a plurality of distributions depicted in the initial measurement of the EELS spectrum at different high-tension offsets to corresponding spectrum distributions in the initial measurement of the EELS spectrum at the corresponding high-tension offset.

14. The computer readable media of claim 10, wherein in response to determining that the simulated EELS spectrum is within the threshold fit of the initial measurement of the EELS spectrum, selecting said simulated EELS spectrum as the simulated EELS spectrum fit to the initial measurement of the EELS spectrum.

15. The computer readable media of claim 10, wherein in response to determining that the simulated EELS spectrum is not within the threshold fit of the initial measurement of the EELS spectrum, performing one or more additional simulations.

16. The computer readable media of claim 15, where performing the one or more additional simulations comprises iteratively adapting values of aberration parameters used in the one or more additional simulations, and recalculating the simulated EELS spectrum, until the best fit is found between the initial measurement of the EELS spectrum and a particular simulated EELS spectrum.

17. The computer readable media of claim 1, wherein tuning the EELS spectrometer based on the value of the aberration parameter comprises adjusting one or more optical elements of the EELS spectrometer based on the aberration parameter associated with the simulated EELS spectrum fit.

18. The computer readable media of claim 1, wherein the method further comprises a process comprising:

capturing a second measurement of the EELS spectrum;

generating a second simulated EELS spectrum fit to the second measurement of the EELS spectrum;

estimating a second value of a second aberration parameter based on the second simulated EELS spectrum; and tuning the EELS spectrometer based on the second value of the second aberration parameter.

19. The computer readable media of claim 18, further comprising repeating the process until an image measured by the charged particle system is within a threshold similarity to an expected value for a tuned system.

20. A charged particle system for investigating a sample, the system comprising:

a sample holder configured to hold a sample;

an electron source configured to emit a beam of electrons towards the sample;

an optical column configured to cause the beam of electrons to be incident on the sample;

an EELS spectrometer configured to correct for aberrations;

one or more detectors configured to detect electrons of the electron beam and/or emissions resultant from the electron beam being incident on the sample, the one or more detectors comprising at least an EELS detector;

one or more processors; and a memory storing computer readable instructions that, when executed by the one or more processors, cause the system to perform the method comprising:

obtaining an initial measurement of an EELS spectrum;

generating a simulated EELS spectrum fit to the initial measurement of the EELS spectrum;

estimating a value of an aberration parameter based on the simulated EELS spectrum; and tuning the EELS spectrometer based on the value of the aberration parameter.

* * * * *